United States Patent [19]
Klein et al.

[11] Patent Number: 5,107,969
[45] Date of Patent: Apr. 28, 1992

[54] CONTROLLABLE VIBRATION DAMPER

[75] Inventors: Hans-Christof Klein, Hattersheim; Peter Lohberg, Friedrichsdorf, both of Fed. Rep. of Germany

[73] Assignee: Alfred Teves GmbH, Frankfurt am Main, Fed. Rep. of Germany

[21] Appl. No.: 402,009

[22] Filed: Sep. 1, 1989

Related U.S. Application Data

[63] Continuation of Ser. No. 246,123, Sep. 16, 1988, abandoned.

[30] Foreign Application Priority Data

Sep. 17, 1987 [DE] Fed. Rep. of Germany ....... 3731152
Sep. 17, 1987 [DE] Fed. Rep. of Germany ....... 3731228

[51] Int. Cl.$^5$ .............................................. F16F 9/46
[52] U.S. Cl. .................................. 188/299; 188/319; 280/707; 280/714
[58] Field of Search ............... 188/299, 319; 280/707, 280/714

[56] References Cited

U.S. PATENT DOCUMENTS

| | | | |
|---|---|---|---|
| 4,065,154 | 12/1977 | Glaze . | |
| 4,573,705 | 3/1986 | Kanai et al. | 280/707 X |
| 4,651,290 | 3/1987 | Masaki et al. | 280/707 X |
| 4,686,628 | 8/1987 | Kuroki et al. . | |
| 4,697,825 | 10/1987 | Hayashi et al. | 188/272 X |
| 4,749,069 | 6/1988 | Knecht et al. . | |

FOREIGN PATENT DOCUMENTS

| | | | |
|---|---|---|---|
| 224815 | 11/1986 | European Pat. Off. . | |
| 243613 | 2/1987 | European Pat. Off. . | |
| 3708581 | 10/1987 | Fed. Rep. of Germany . | |
| 3712477 | 10/1987 | Fed. Rep. of Germany . | |
| 85707 | 5/1983 | Japan | 188/299 |
| 183215 | 9/1985 | Japan | 280/707 |
| 1450765 | 9/1976 | United Kingdom . | |

Primary Examiner—George E. A. Halvosa
Attorney, Agent, or Firm—Robert P. Seitter; J. Gordon Lewis

[57] ABSTRACT

A controllable vibration damper for automotive vehicles is disclosed having a damping piston which is axially slidably and sealedly guided in a damping tube, and which subdivides the damping tube filled with a damping medium into two working chambers. The connection between the two working chambers is provided with at least one non-regulated first valve and at least one controllable second valve, which valves are arranged acting hydraulically in parallel in respect to one another. In order to be able to regulate the effective damping force continuously in wide ranges, for the adjustment of damping hardness, the controllable valve will periodically open and close in rapid sequence in dependence upon pulsed control signals.

14 Claims, 3 Drawing Sheets

CONTROLLABLE VIBRATION DAMPER

This is a continuation of co-pending application Ser. No. 07/246,123 filed on Sept. 16, 1988, now abandoned.

BACKGROUND OF THE INVENTION

The present invention relates to a controllable vibration damper.

Vibration dampers having adjustable characteristics are known. The mechanism for adjustment of the damping force changes the flow openings for the directions of compressive and trajectory motion. It is conventional practice in the prior art to have a predefined set of diaphragms or throttles for this purpose, which will be chosen and activated singularly or in combination as required. Various designs have been used in this respect.

One system is based on a perforated disc which is twisted electromotively, such that flow passage openings of differing flow resistance are chosen. The number of different openings corresponds directly to the number of different discreet damping stages.

Another system is based on non-adjustable, permanently effective flow passage openings connected in parallel with further flow passage resistances for the purpose of adjusting the damping force. The respective totals flow resistance resulting will then determine the damping effect. The number of possible combinations of total resistances dictates the number of possible damping stages.

The adjustment speeds between the individual stages are different, depending on the principle of adjustment. Valve reaction times in the range of 10 millisecs are referred to as 'quick', in the context of the above statements, in contrast to other adjustment mechanisms with a reaction time in the range of 50 millisecs up to several seconds which are rated as 'slow'.

There are system embodiments which permit selection by switches of different stages of comfort (e.g., 'sportive-hard sprung', 'normal', 'softly sprung', etc.). Other system embodiments are existing in which this change-over of ranges is performed automatically according to predefined speed and acceleration thresholds. The latter are referred to as 'controlled dampers'. For reaction to speed limits, slow actuators are sufficient. For reaction to impacts, short-term high accelerations, fast actuators are required. The only advantage of speed-responsive slow control actions is increased driving comfort. The advantage of quick controlled dampers lies in the possibility of augmenting the driving comfort to a maximum and changing over for a short time to maximize driving safety in the instance this is needed.

Due to the coarse adjustment stage, all previous technical solutions presently permit merely actuating working points on a limited number of predetermined characteristic curves within the plane of the possible range of use. That means, none of the present technical solutions complies with the necessity of being able to react correspondingly finely to an acceleration signal having a sufficient sensor resolution. Yet, a high resolution would be advisable from a technical point of view in order to be able to sensitively react to the demand for damping with a view to ensuring driving safety. If the interests of comfort play the predominant role, practice has proven that the untrained user is not in a position to make a distinction between more than three stages of hard suspension. In the majority of cases, the untrained user only feels the difference in comfort between 'extremely hard sprung' and 'extremely softly sprung'. Moreover, tests with quick controlled dampers have proven that the damping system remains automatically in the 'comfort stage' for approximately 90% of the driving time and changes over to 'safety stage' for roughly 10% of the driving time. It is remarkable in this regard that the medium stages are required only for a short time, as transition stages so-to-speak. (Of course, this applies only for ranges of normal speed; at high speeds, 'hard sprung' damping is formed for reasons of safety!).

SUMMARY OF THE INVENTION

Therefore, it is an object of the present invention to devise a controllable vibration damper which allows continuous regulation of the effective damping force in wide ranges, the effort entailed thereby being comparatively limited.

The invention described hereinbelow improves the insufficiencies of the state of the art in a simple and progressive manner. The advantage of this invention does not only reside in the possible increase of driving comfort by a sensitive adjustment of the damping hardness, but also in the resulting possibilities in the active increase of driving safety during anti-lock controlled braking operations (ABS). While the electronic control has brought about driving stability and an adherence ability that is improved in the time average, the use of inventively regulated vibration dampers will permit additionally an increase in the time average value of the normal force (vertical tire force). This also applies for traction slip control operations. With the aid of additional acceleration sensors and the slip characteristic values found by the anti-lock/traction slip control electronics, additional corrective signals for the vibration dampers can be calculated which cause a modulation of the vibration damper hardness which conforms to the ascertained adherence value of the road (asphalt, ice etc.).

The basic idea of the present invention resides in using only one single controlled cumulative flow passage opening for rebound travel and/or compression travel, yet to permanently switch it between opened and closed positions in rapid sequence. The continuously variable damping force will then be attained either in that, at a constant change-over frequency, the pulse ratio between valve-opened time and valve-closed time will be chanted, or in that the frequency will be varied while the pulse ratio is invariably set. The effort needed for technically realizing this solution is very small indeed. The attainable resolution is greater many times over, than has been achieved so far by the previous state of the art.

The present invention can be used for any type of vibration dampers and on related control valves of any construction whatsoever. It has to be taken into consideration when selecting the control valves, that the electric and hydraulic time constants of the damper valves correspond to those time constants of the anti-lock/traction slip control valves in respect to the switching speed (millisecond range). To reach this aim, it is definitely in accordance with the spirit of the invention to compose the cumulative cross-section to be activated of synchronously activated partial cross-sections.

According to this invention, the modulation of the damping effect is performed by modulating the average valve-opened time. In technical respect, this action can be realized as a linear movement or a rotational movement. In the case of the linear movement, the solenoid unit will move, e.g., a spring-loaded slide to and fro in front of a flow passage opening. The valve-opened time will then correspond to the period of time in which the slide or the slide openings release the flow passage. In the event of the rotational movement, a motor-driven rotating spring-loaded radial slide will more or less, depending on the magnitude of the centrifugal force, open a flow passage opening in the time average.

BRIEF DESCRIPTION OF THE DRAWING

The function and further advantages of the present invention can be gathered from the following Detailed Description of a Preferred Embodiment of this invention with reference to the accompanying drawing. In the drawing.

DETAILED DESCRIPTION OF A PREFERRED EMBODIMENT

Figure 1:
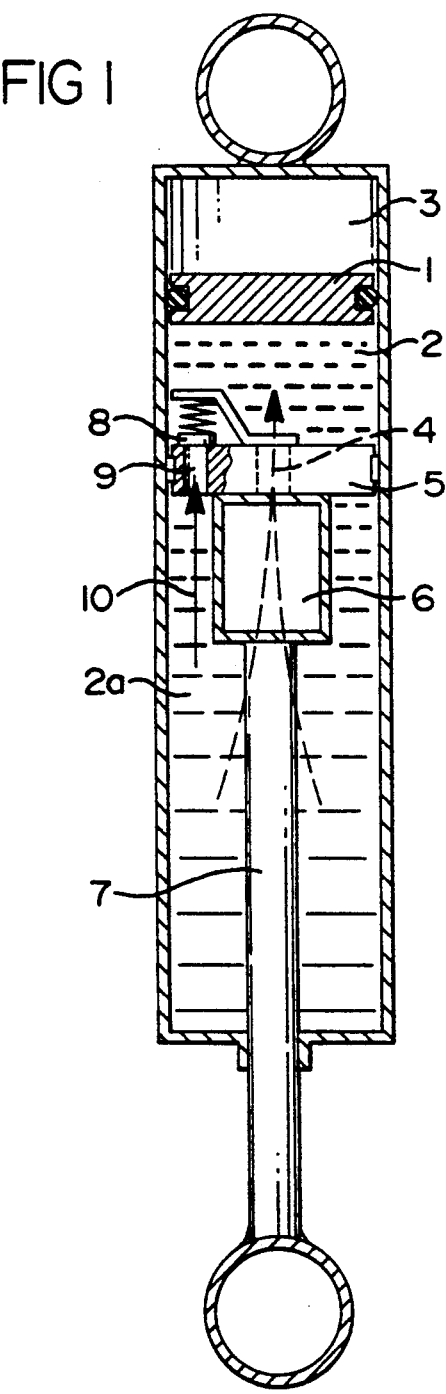
FIG. 1 shows schematically the structure of an inventive vibration damper.
Figure 4:
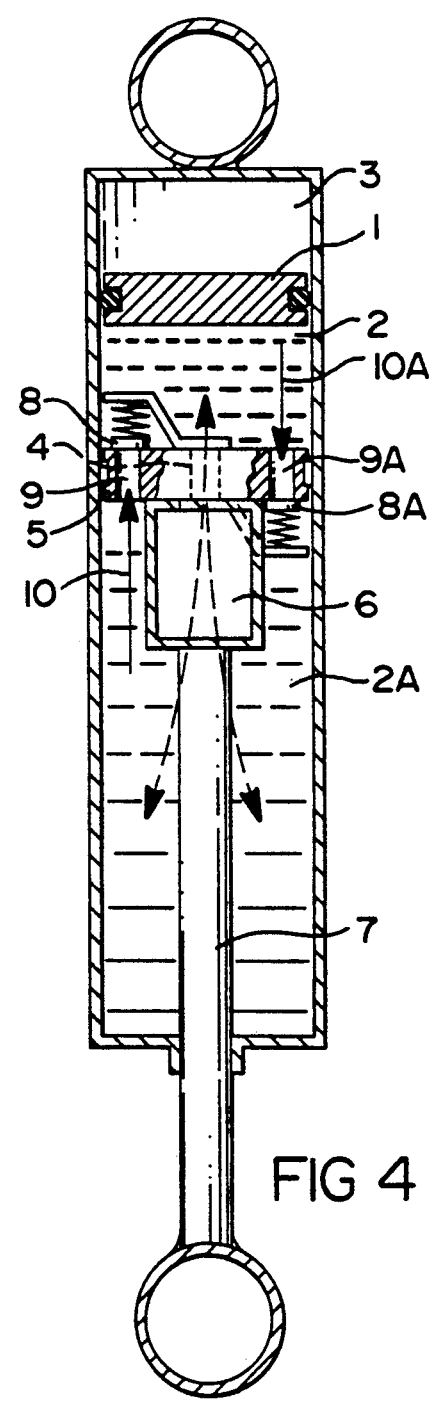
FIG. 4 is an axial section view of a damper in accordance with this invention illustrating the use of two non-regulated valves.

FIG. 1 shows, in a simplified view, a modified single-tube damper according to the de Carbon principle. For the sake of clarity, only the elements for the operation in the direction of trajectory motion have been illustrated. The control of the bypass fluid flow applies for both directions. However, a further non-regulated valve is effective for the direction of compressive motion as shown in FIG. 4. The separating piston 1 separates working chamber 2 and gas chamber 3 in a known fashion.

The damping piston 5 is coupled with the piston rod 7 via a block accommodating a controllable valve 6 for the operation according to this invention. (The electrical supply lines are not shown). As is indicated by the arrow 4, a pulse-controlled bypass flow is supplied from the bottom working chamber 2a through the control valve 6 and a bore in the damping piston 5 into the upper working chamber 2. There is provision for a non-regulated, passive spring-loaded valve 8 which closes a piston bore 9. At a predefined pressure, this valve opens and permits propagation of a pressure-responsive basic fluid flow, shown by arrow 10. The term 'cumulative flow-passage opening' relates to the function of the controlled valve 6. The co-action of the valves 6 and 8 takes place non-linearly in opposite directions and must be calibrated by tests. The two valves 6 and 8 influence each other mutually. With increasing opening of the control valve 6 (roughly parabolic progressive characteristic curve), the opening effect of the spring-loaded valve 8 (degressive characteristic curve) will decrease and vice-versa. In the embodiment of FIG. 4, a second non-regulated passive spring loaded valve 8A and piston bore 9A are provided. The valve 8A is arranged to permit propagations of a pressure-responsive basic fluid flow as shown by arrow 10A. Thus, valve 8 will operate during the extension stroke and valve 8A during the compressive stroke of the vibration damper.

Figure 2:
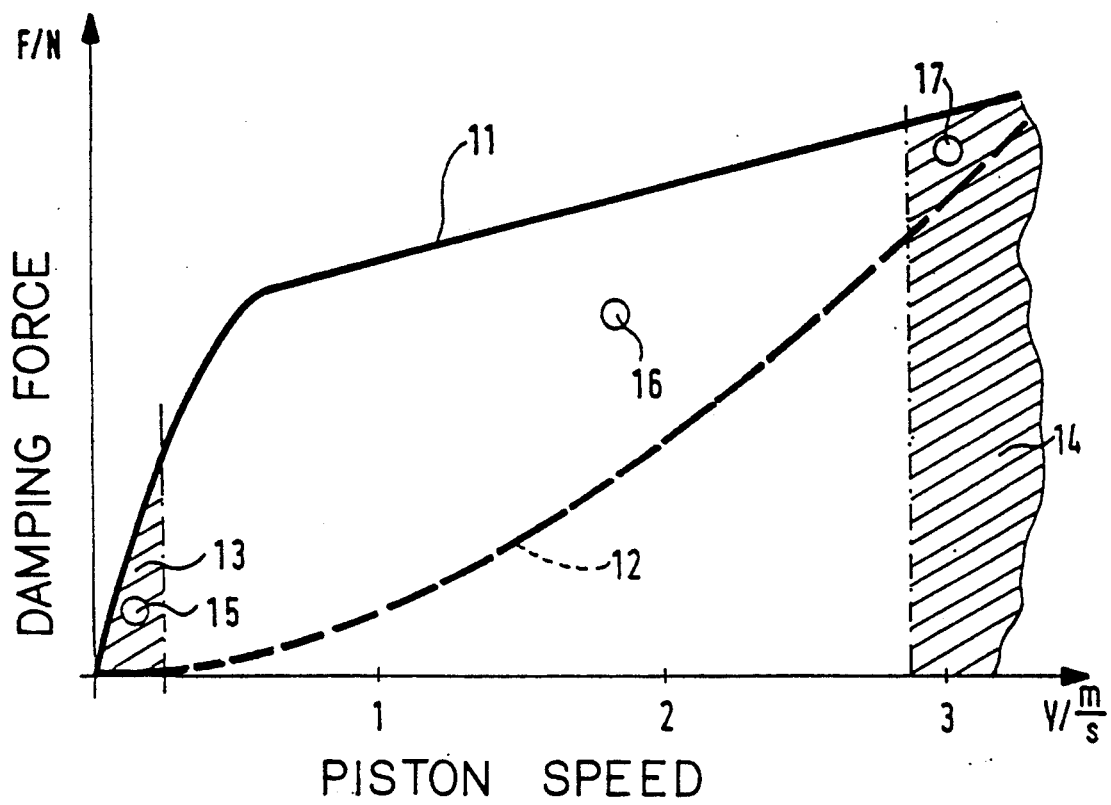
FIG. 2 shows a diagram of the damping force in dependence upon the piston speed.

FIG. 2 shows the principal course of the two characteristic curves, displayed for the rebound travel. Herein, reference numeral 11 designates the characteristic curve of the spring-loaded valve 8 (with the control valve 6 closed) and 12 is the characteristic curve of the control valve 6 (with the spring-loaded valve 8 closed). The hatched characteristic curve area 13 is that piston speed area in which one stays, according to practical experience, roughly 90% of the driving time and in which it is desired to finely control the damper hardness. An inventively actuated working point 15 normally will be disposed somewhere between the two basic characteristic curves within this area.

The hatched characteristic curve area 14 is the second frequent piston speed range, according to practical experiences. Such piston speeds are caused by potholes etc. A working point 17 in this area would have to be produced by pulsed operation of operating the control valve to assume an almost entirely "closed" position. This makes another advantage apparent. The characteristic curve 12 approximates the characteristic curve 11 with increasing piston speed. As a result, it is ensured in the event of a malfunction of the control valve 6 (inexpedient case: permanently open) that a medium-large resultant damping force will always be maintained. Finally, a working point 16 is shown as it could be actuated for a short time in practical operations during transient actions. The damping characteristic of the vibration damper is adjusted by controlling the opening and closing of the valve 6. Preferably, the valve 6 is controlled electronically and this is conveniently achieved by utilizing an anti-lock computer as described with respect to FIG. 3. By opening and closing the valve 6 in rapid sequence in response to an electric control signals, preferably a pulsed signal, the damping characteristic of the vibration damper can be automatically controlled and a continuously variable damping force can be attained. For example, if the electric control signal causing the valve 6 to change over is of constant frequency the ratio of valve open to valve closed time can be chanted; on the other hand, if the ratio of valve open to valve closed time is maintained constant, the frequency of the control signal can be changed.

Figure 3:
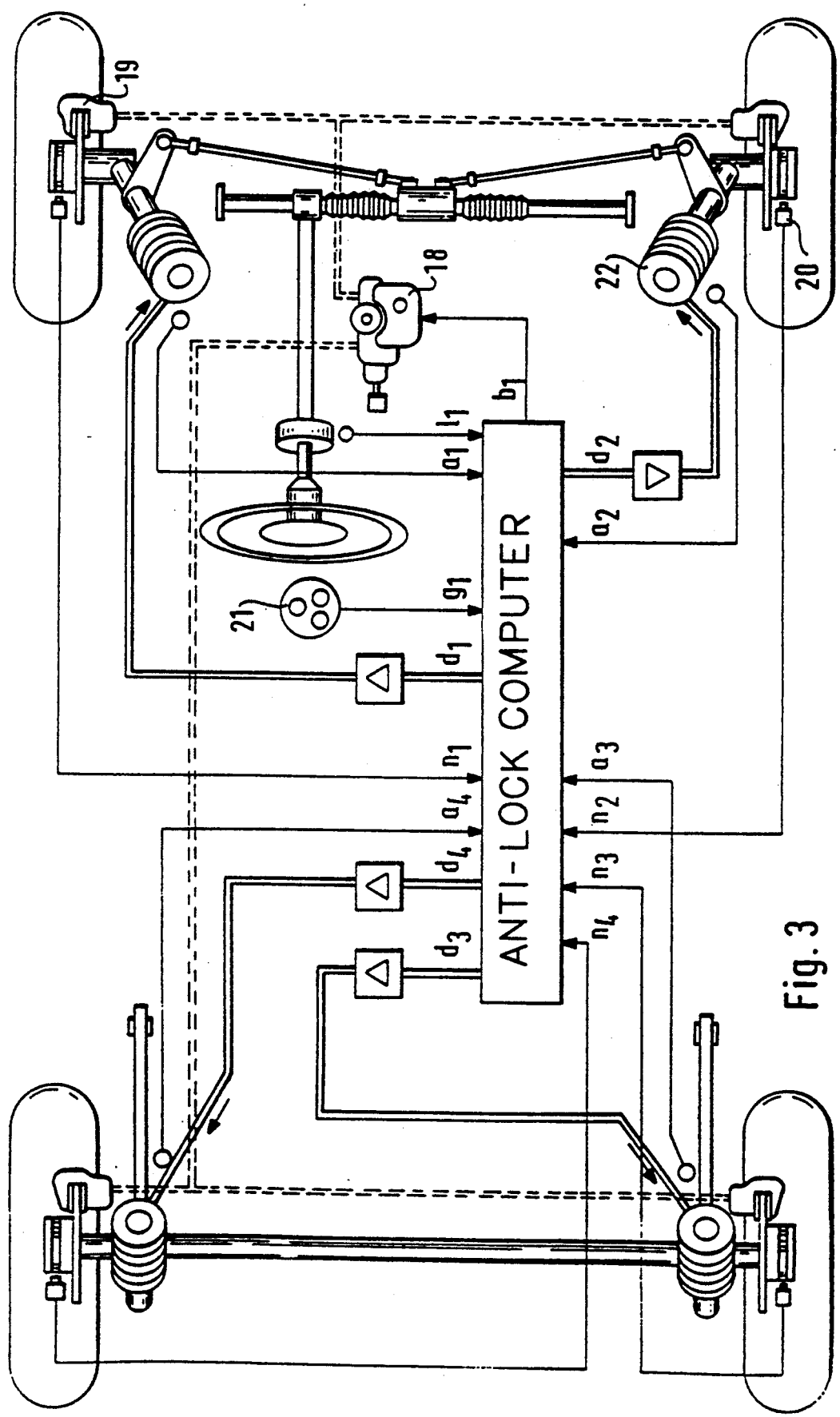
FIG. 3 is an example of application of inventive controllable vibration dampers in connection with an anti-lock/traction slip control system.

FIG. 3 shows an inventive type of use for assisting anti-lock/traction slip control actions. In this arrangement, the anti-lock computer receives sensor signals from the four wheel sensor 20 (wheel rotational speed n1, n2, n3, n4) and forms control signals b1 for the actuation of the brake unit 18 which accordingly operates the brakes 19 in a known fashion. There is provision for further sensors which measure quantities of motion (position and/or speed and/or acceleration) between the wheel and the chassis, and which issue corresponding signals a1, a2, a3, a4 to the anti-lock computer. From these quantities of motion and the anti-lock parameters, the anti-lock computer calculates control data and respectively sends control signals for the regulation of the dampers 22 according to the inventive method. It is advantageous, and possibly necessary, to additionally use a yaw-acceleration sensor 21 (signal g1) and/or to additionally sense the steering angle (signal 1).

The brake force is computed from the product of the vertical tire force and the frictional value between road and tire. The anti-lock function in the classical sensor optimizes the exploitation of the coefficient of friction. The control program for the exploitation of the controllable vibration damper 22 as a component part of the anti-lock/traction slip control functions is inventively designed such that, in addition thereto, the time average value of the vertical tire forces is optimized, in dependence upon the magnitude of the exploitable coefficient of friction determined by the anti-lock control.

What is claimed is:

1. A controllable vibration damper for an automotive vehicle comprising: a damping tube; a damping piston axially slidable and sealedly guided in the damping tube, the piston dividing the tube into two working chambers; at least one first valve in a first flow passage between the two working chambers, said first valve being biased to a closed position; at least one controllable second valve in a flow passage between the two working chambers for periodically opening and closing, said first and second valve being arranged hydraulically in parallel with one another and each of said valves providing a different damping force characteristic so that the opening and closing of the second valve influences the opening of the first valve and adjusts the damping characteristic of the damper through a range defined by the two different damping force characteristics, wherein the ratio of the valve opened time to valve closed time of the second valve is adjustable for responding to a constant frequency signal.

2. The controllable vibration damper as claimed in claim 1, wherein the first valve has a characteristic curve different from that of the second valve.

3. The controllable vibration damper as claimed in claim 1, wherein the first valve has a degressive characteristic curve damping force=f (piston speed) and the second valve has a progressive, roughly parabolic characteristic curve.

4. The controllable vibration damper as claimed in claim 1, wherein the control signals for continuously varying damping forces are generated by an anti-lock/traction slip control computer based on sensed quantities of motion.

5. The controllable vibration damper as claimed in claim 1, wherein the second valve is electronically controllable and responsive to electrical control signals.

6. The controllable vibration damper as claimed in claim 1, wherein two first valves and two flow passages are provided, one of said first valves opening when the damping piston moves in one direction and the other of said first valves opening when the damping piston moves in the other direction.

7. The controllable vibration damper as claimed in claim 1, wherein the first and second flow passages are formed in the piston.

8. A controllable vibration damper for an automotive vehicle comprising: a damping tube; a damping piston axially slidable and sealedly guided in the damping tube, the piston dividing the tube into two working chambers; at least one first valve in a first flow passage between the two working chambers, said first valve being biased to a closed position; at least one controllable second valve in a flow passage between the two working chambers for periodically opening and closing, said first and second valve being arranged hydraulically in parallel with one another and each of said valves providing a different damping force characteristic so that the opening and closing of the second valve influences the opening of the first valve and adjusts the damping characteristic of the damper through a range defined by the two different damping force characteristics, wherein the ratio of the valve opened time to valve closed time of the second valve is maintained constant for responding to a changeable frequency signals.

9. The controllable vibration damper as claimed in claim 8, wherein the first valve has a characteristic curve different from that of the second valve.

10. The controllable vibration damper as claimed in claim 8, wherein the first valve has a degressive characteristic curve damping force=f (piston speed) and the second valve has a progressive, roughly parabolic characteristic curve.

11. The controllable vibration damper as claimed in claim 8, wherein the control signals for continuously varying damping forces are generated by an anti-lock/traction slip control computer based on sensed quantities of motion.

12. The controllable vibration damper as claimed in claim 8, wherein the second valve is electronically controllable and responsive to electrical control signals.

13. The controllable vibration damper as claimed in claim 8, wherein two first valves and two flow passages are provided, one of said first valves opening when the damping piston moves in one direction and the other of said first valves opening when the damping piston moves in the other direction.

14. The controllable vibration damper as claimed in claim 8, wherein the first and second flow passages are formed in the piston.

* * * * *